US011283485B2

United States Patent
Holz et al.

(10) Patent No.: US 11,283,485 B2
(45) Date of Patent: Mar. 22, 2022

(54) CIRCUIT FOR SIGNAL CONNECTION, DEVICE FOR INDUCTIVE POWER TRANSFER AND FOR SIGNAL TRANSMISSION

(71) Applicant: MOLEX CVS DABENDORF GMBH, Zossen (DE)

(72) Inventors: Rainer Holz, Berlin (DE); Jasminka Serafimoska Nedanovska, Berlin (DE)

(73) Assignee: MOLEX CVS DABENDORF GMBH, Zossen (DE)

( * ) Notice: Subject to any disclaimer, the term of this patent is extended or adjusted under 35 U.S.C. 154(b) by 0 days.

(21) Appl. No.: 17/257,584

(22) PCT Filed: Jul. 1, 2019

(86) PCT No.: PCT/EP2019/067641
§ 371 (c)(1),
(2) Date: Jan. 4, 2021

(87) PCT Pub. No.: WO2020/007811
PCT Pub. Date: Jan. 9, 2020

(65) Prior Publication Data
US 2021/0273682 A1    Sep. 2, 2021

(30) Foreign Application Priority Data
Jul. 4, 2018   (DE) .......................... 102018211016.6

(51) Int. Cl.
*H04B 5/00*      (2006.01)
*G06K 7/10*      (2006.01)
*H03H 7/01*      (2006.01)

(52) U.S. Cl.
CPC ......... *H04B 5/0037* (2013.01); *H04B 5/0031* (2013.01); *H04B 5/0075* (2013.01)

(58) Field of Classification Search
None
See application file for complete search history.

(56) References Cited

U.S. PATENT DOCUMENTS

| 8,559,890 B2* | 10/2013 | Merlin ................. H04B 5/0025 455/73 |
| 9,019,167 B2* | 4/2015 | Merlin ............... G06K 19/0723 343/860 |
| DE | 102011055809 | 5/2013 |
| DE | 102013015736 | 4/2014 |

(Continued)

FOREIGN PATENT DOCUMENTS

| CN | 101552614 A | 10/2009 |
| CN | 103199333 A | 7/2013 |

(Continued)

OTHER PUBLICATIONS

Gebhart et al, "Active Load Modulation for Contactless Near-Field Communication", IEEE International Conference on RFID—Technologies and Applications (RFID—TA), pp. 228-233, 2012.

(Continued)

*Primary Examiner* — Tuan A Tran (57) ABSTRACT

A circuit for the connection, by means of signals, of a microcontroller for generating a near-field communication signal to an antenna structure for near-field communication signal transmission, the circuit including a filter circuit and the antenna structure, the filter circuit being an even-numbered order filter circuit, the ordinal number being at least 4, wherein an amplitude response (FG) of the circuit decreases monotonically in a defined frequency range.

13 Claims, 2 Drawing Sheets

(56) References Cited

U.S. PATENT DOCUMENTS

| | | | |
|---|---|---|---|
| 9,066,198 B2* | 6/2015 | Chung | H04B 5/0075 |
| 9,070,062 B2* | 6/2015 | Rezayee | G06K 7/10009 |
| 9,184,799 B2* | 11/2015 | Jang | H04B 5/0087 |
| 9,246,550 B2* | 1/2016 | Merlin | H04B 5/0031 |
| 9,292,782 B2* | 3/2016 | Savoj | G06K 19/07749 |
| 9,306,630 B2* | 4/2016 | Dhayni | H04B 5/0031 |
| 9,571,168 B2* | 2/2017 | Moon | H04W 4/80 |
| 10,055,613 B1* | 8/2018 | Bienert | H04B 5/0056 |
| 10,108,825 B2* | 10/2018 | Bienert | H04B 5/0075 |
| 10,110,281 B2* | 10/2018 | Ding | H04B 5/005 |
| 10,148,321 B2* | 12/2018 | Jang | H04B 5/0081 |
| 10,200,091 B2* | 2/2019 | Ding | H04B 5/0031 |
| 10,346,732 B2* | 7/2019 | Philip | G06K 19/0712 |
| 10,361,474 B2* | 7/2019 | Ding | H01Q 1/243 |
| 10,511,347 B2* | 12/2019 | Hueber | H04B 5/0031 |
| 10,516,445 B2* | 12/2019 | Hueber | H04W 4/80 |
| 2018/0096341 A1 | 4/2018 | Shivnaraine et al. | |
| 2018/0165560 A1* | 6/2018 | Philip | H04B 5/02 |

FOREIGN PATENT DOCUMENTS

| | | |
|---|---|---|
| DE | 102014113910 A1 | 3/2016 |
| EP | 2339501 A1 | 6/2011 |
| EP | 3174214 A1 | 5/2017 |
| WO | 2020007811 A2 | 1/2020 |

OTHER PUBLICATIONS

International Search Report and Written Opinion received for PCT Application No. PCT/EP2019/067641 dated Jan. 7, 2020, 25 Pages. (12 Pages of English Translation and 16 Pages of Official copy).

International Preliminary Report on Patentability received for PCT Application No. PCT/EP2019/067641 dated Jan. 14, 2021, 22 Pages. (11 Pages of English Translation and 10 Pages of Official copy).

"Electronic Filter", Wikipedia, Retrieved from Internet URL: https://en.wikipedia.org/wiki/Filter_(signal_processing), 7 Pages, Feb. 18, 2021.

* cited by examiner

CIRCUIT FOR SIGNAL CONNECTION, DEVICE FOR INDUCTIVE POWER TRANSFER AND FOR SIGNAL TRANSMISSION

RELATED APPLICATIONS

This application is a national phase of PCT/EP2019/067641, filed on Jul. 1, 2019, which is incorporated herein by reference in its entirety and which claims priority to German Application No. 102018211016.6, filed on Jul. 4, 2018.

TECHNICAL FIELD

The invention relates to a circuit for the connection, by means of signals, of a unit for generating a near-field communication signal to an antenna structure for near-field communication signal transmission, a device for inductive power transfer and for signal transmission and a method for manufacturing a circuit for the connection, by means of signals, of a unit for generating a near-field communication signal to an antenna structure for near-field communication signal transmission.

DESCRIPTION OF RELATED ART

For the transmission of near-field communication signals, a near-field communication signal generated by an appropriate unit is usually transmitted via a filter circuit and a so-called matching circuit to an appropriate antenna structure. This filter circuit serves for damping signal components in undesired frequency ranges.

EP 2 339 501 A1 discloses a near-field communication unit.

DE 10 2013 015 736 A1 discloses an antenna matching circuit.

DE 10 2014 113 910 A1 discloses an antenna circuit, in particular an antenna matching circuit, for use with transmission antennae for a near-field communication. Near-field communication (NFC) is a communication technology which is known and proven in the state of the art, in order to facilitate an authentication, an exchange of data or a payment transfer by letting two transmitting/receiving units approach one another.

These antenna circuits known from the state of the art use second order low-pass filters. Thus, it is shown e.g. in FIG. 1 of EP 2 339 501 A1 that a filter and a matching circuit are arranged in an electrical circuit between an integrated circuit and an antenna, wherein the filter is a second order filter. An amplitude response of the total circuit reaches only a drop of 60 dB in the first frequency decade.

DE 10 2013 015 736 A1 also discloses only a second order low-pass, wherein this is connected together with additional capacitors and coils, which form a so-called Pi filter. Here, the Pi filter is part of a matching circuit, the function of which will be described in more detail hereinafter. However, tests have shown that the described circuit does not provide the desired damping of the harmonics of the NFC carrier signal, in particular in the VHF range.

It is disadvantageous that the known circuits do not meet the strict criteria of an electromagnetic compatibility, in particular when used in cars.

SUMMARY

The technical problem consists in the creation of a circuit for the connection, by means of signals, of a unit for generating a near-field communication signal to an antenna structure for near-field communication signal transmission, a method for producing such a circuit and a device for inductive power transfer and for signal transmission, which improve the electromagnetic compatibility of the unit when generating the near-field communication signal, in particular when the unit is part of a device for inductive power transfer and for signal transmission.

Furthermore, the technical problem consists in facilitating a near-field communication which is as loss-free as possible. Furthermore, the technical problem consists in facilitating a near-field communication which fulfils as reliably as possible the conditions for near-field communication, for example in the form of legal requirements or standards, for example of the NFC forum.

The solution to the technical problem results from the subject matters having the features of the independent claims. Further advantageous embodiments result from the subject matters having the features of the sub-claims.

A circuit is proposed for the connection, by means of signals, of a unit for generating a near-field communication signal to an antenna structure for near-field communication signal transmission.

The circuit can be installed in a vehicle. In particular, the circuit can in this regard be connected by means of signals and/or data with a vehicle communication system and/or with an on-board network of the vehicle. This is however not absolutely necessary. Of course, the circuit can be used also in other application areas which require a signal transmission for near-field communication, e.g. in remote controls, control units, for the transmission of signals from and to rail vehicles et cetera.

The unit for generating a near-field communication signal can be in the form of a computer system or at least comprise such a computer system. The computer system can in particular be a microcontroller.

The near-field communication signal can in particular be generated with a basic frequency or carrier frequency of 13.56 MHz, wherein this basic frequency can also be described as a fundamental frequency.

However, it is of course conceivable for the near-field communication signal to comprise further frequencies, in particular further side frequencies. Side frequencies can in particular be harmonics of the basic frequency.

The circuit comprises at least one filter circuit and the antenna structure for near-field communication signal transmission. The antenna structure describes in this regard a structure which generates an electromagnetic field when an alternating voltage is applied to it. This electromagnetic field can be received by a receiver device.

The filter circuit can denote an arrangement of electrical or electronic elements which in their entirety provide desired electrical properties, in particular filter properties. The filter circuit is preferably a low-pass filter circuit, i.e. a filter circuit with the properties of a low-pass filter. However, it is also conceivable for the filter circuit to be a band-pass filter circuit, i.e. a filter circuit with the properties of a band-pass filter.

Furthermore, the filter circuit is an even-numbered filter circuit, wherein the ordinal number is at least 4 according to the invention. Thus, it is possible for the ordinal number of the filter circuit also to be 6, 8 et cetera. The filter circuit can in this regard be provided by connecting one after another, that is in series, several second order low-pass filters. In this regard, a second order low-pass filter can be provided by connecting one after another, that is in series, two first order low-pass filters. However, it is also possible to provide a second order low-pass filter by connecting electrical or electronic elements without a series connection of two low-pass filters being present, e.g. by connecting one inductive element and one capacitive element.

Thus, for example, a fourth order filter circuit can be provided by connecting one after another two second order low-pass filter circuits. At least a portion of the amplitude response or absolute value frequency response, in particular a course of the absolute value of the amplitude ratio explained hereinafter depending on the frequency, for example in the Bode diagram, of a nth order filter circuit can have a negative gradient, in particular a gradient of −n×20 dB per frequency decade. Alternatively, but preferably cumulatively, the filter circuit can damp an input signal, that is weaken the input signal.

The amplitude response a can in this regard describe a logarithmic connection between a ratio or an absolute value of the ratio of the amplitude of the output signal Uout of the circuit and the amplitude of an input signal Uin of the circuit and the frequency f of the input signal, in particular in the form $$a = 20 \times \log |(U\text{out}/U\text{in})| \qquad \text{Formula 1.}$$

In the case of a damping, the amplitude response a has a negative value.

The input signal can here be generated by the described unit for generating a near-field communication signal. The output signal can describe the signal dropping/applied at the antenna structure for near-field communication signal transmission. The amplitude response can also be described as an attenuation curve.

Furthermore, an amplitude response of the circuit decreases monotonically in a defined frequency range. A minimum frequency of the defined frequency range can for example be 14.4 MHz or comprise frequencies which are higher than 14.4 MHz. Here, the defined frequency range can be a one-sided open range, that is open to higher frequencies. However, it is also possible for a maximum frequency of the defined frequency range to equal a defined frequency. This can for example be 100 GHz.

Furthermore, the amplitude response can have a predetermined decay in the defined frequency range, wherein the decay describes a negative gradient of the amplitude response. It is also possible for the decay in the defined frequency range to be stronger or higher than a defined minimum decay. Thus, different decay values can exist for different frequencies in the frequency range, wherein, however, all decay values are larger than the minimum decay. This minimum decay can for example be 80 dB per decade.

Furthermore, it is possible for the amplitude response or attenuation curve to decline at different rates in different partial ranges of the defined frequency range, or that the minimum decays specific to the partial range are different from one another, wherein the minimum decay specific to the partial range describes the weakest or lowest decay in the corresponding partial range. In this regard, a decay in the amplitude response describes an increase in the damping.

Thus, in particular, it is possible for a partial range with comparatively low frequencies to have a higher decay or a higher minimum decay than a partial range with comparatively higher frequencies. Preferably, a decay or a minimum decay in the first decade of the frequency range, that is in a partial range between 14.4 MHz (inclusively or exclusively) and 114.4 MHz (inclusively or exclusively) is larger than in a partial range which comprises frequencies higher than 114.4 MHz.

For example, in this first decade, a minimum decay can be larger than or equal to 100 dB, preferably larger than or equal to 107 dB. In this case, a minimum decay in further partial ranges can be less than 100 dB or 107 dB but larger than 80 dB. This results advantageously in a particularly high damping of frequencies in the VHF frequency range, that is frequencies in the range from 87 MHz to 108 MHz. This is particularly advantageous since when generating near-field communication signals, in particular by means of a so-called transmitter stage, many harmonic oscillations, for example the sixth, seventh and eighth harmonic of the previously described basic or fundamental frequency signal, can be produced, the frequencies of which lie in the described VHF frequency range and customer-specific EMC limit values in this VHF frequency range are especially low.

This facilitates advantageously an especially effective reduction in frequencies which are not required for near-field communication signal transmission. Thus, the previously known second order filter circuits, when used as filter circuits in the described circuit, in comparison reach in the first decade only a damping of 60 dB. In the VHF frequency range, in particular at the seventh harmonic with the frequency 94.92 MHz, a damping higher by 45 dB, or in particular an even higher damping, in comparison with the circuit disclosed in DE 10 2013 015 736 A1, for example a damping of 64 dB, can be achieved with the proposed circuit in comparison to the use of the previously known second order filter circuits.

Thus the proposed circuit results in a particularly good improvement of the EMC (electromagnetic compatibility), in particular of the so-called radiated interference emissions which are output via the antenna structure to the environment. In particular, in comparison with the filter circuits known from the state of the art, a damping can be achieved which is higher by almost 46 dB or even more, in particular in the described first decade.

In a further embodiment, the circuit comprises at least one compensation circuit, which can also be described as a matching circuit. The compensation circuit serves for matching the resonance frequency of the proposed circuit to a defined frequency, in particular to the fundamental frequency. This can mean that the resonance frequency of the proposed circuit deviates by no more than a defined quantity from the defined frequency. The compensation circuit can in this regard comprise electrical and/or electronic elements with defined electrical properties. Here, the compensation circuit can be configured such, and/or the electrical properties can be selected such, that the resonance frequency is matched to the defined frequency.

In particular, the proposed circuit can comprise a series connection of the filter circuit and the compensation circuit. Thus, the compensation circuit can be connected in series with the filter circuit. Furthermore, in particular, the proposed circuit can consist of a series connection, that is a series circuit, of the filter circuit, the compensation circuit and the antenna structure for near-field communication signal transmission.

This results advantageously in an especially energy-efficient generation of the near-field communication signal since signal losses are minimised by reason of the matching.

In a preferred embodiment, the amplitude response of the circuit decreases strictly monotonically in the defined frequency range. This results advantageously in a further improvement of the EMC.

In a further embodiment, a minimum frequency of the defined frequency range is 14.4 MHz. This has already been explained previously. By means of this specification of the minimum frequency, the advantageous result is that both signal components of the near-field communication signal with the previously described basic frequency, and signal components with a first side frequency, which is for example 13.56 MHz plus 0.848 MHz, can be transmitted in a non-damped or as far as possible non-damped manner, as a result of which the quality of the signal transmission is in turn improved.

In a further embodiment, the electrical properties of elements of the circuit, in particular of the filter circuit, are selected such that an impedance of the circuit, at least at a defined frequency or in a defined frequency range, equals a defined impedance or lies in a defined impedance range.

This can mean that an absolute value of the impedance of the circuit, at least at the defined frequency or in the defined frequency range, equals a defined quantity or lies in a defined impedance quantity range.

The defined frequency can in particular be equal to the previously described carrier frequency. Also, the described carrier frequency can lie in the defined frequency range. Preferably, the defined frequency range is a so-called near-field communication useful band. In this case, the defined frequency range can comprise frequencies from 12.712 MHz to 14.407 MHz.

At a sub-carrier frequency and/or a top-carrier frequency of the carrier frequency, it is also possible for the impedance of the circuit alternatively or cumulatively to equal a defined impedance or to lie in a defined impedance range.

The defined impedance or the defined impedance range can be a function of a maximally admissible or producible transmitting power Pmax and/or of a transmission output voltage U_Tx and/or a maximally admissible or producible transmission output current Imax of the unit for generating a near-field communication signal.

Thus, an absolute value of the defined impedance Z can for example be obtained according to $$|Z| = P\max / I\max 2 \qquad \text{Formula 2}$$

or according to $$|Z| = U\_Tx / I\max \qquad \text{Formula 3.}$$

The defined impedance range can comprise this impedance: in particular, this impedance can be a median impedance of the impedance range, wherein the impedance range can furthermore have a defined size.

Alternatively, the defined impedance range can comprise the impedances which were determined according to formula 2 or formula 3 for several maximally admissible or producible transmitting powers Pmax which are different from one another, or maximally admissible or producible transmission output currents Imax.

The maximally admissible or producible transmitting power Pmax or the maximally admissible or producible transmission output current Imax can here be predetermined/defined.

Also, a range of maximally admissible or producible transmitting powers Pmax or a range of maximally admissible or producible transmission output currents Imax can be predetermined/defined.

In particular, this must be selected such that a reliable near-field communication with defined near-field communication transmitting devices (receiving stations) is guaranteed, in particular without exceeding defined, e.g. statutory, emission limits.

Alternatively or cumulatively, the desired impedance or the desired impedance range can be determined also depending on the application scenario and further limiting conditions, such as e.g. properties of the antenna structure for near-field communication signal transmission. Further alternatively or cumulatively, the desired impedance or the desired impedance range can be selected also depending on electrical properties of the unit for generating the near-field communication signal, and can for example be predetermined by the manufacturer.

For example, the defined impedance range comprises impedances with an absolute value of 20 to 100 ohms, preferably with an absolute value of 30 to 50 ohms. Of course, however, other impedance values are also conceivable.

This results advantageously in an especially low-loss transmission of near-field communication signals.

It is possible that in a filter design step the filter circuit is designed such, and/or electrical properties of elements of the filter circuit are dimensioned such that at least one criterion independent of the previously explained impedance-dependent or impedance range-dependent criterion is fulfilled.

It is possible, for example, that in the filter design step the filter circuit is designed, and/or electrical properties of elements of the filter circuit are dimensioned, such that a cutoff frequency of the filter circuit lies in a range from 14 MHz to 15 MHz, preferably at 14.4 MHz.

If the circuit comprises a compensation circuit, in a compensation design step the compensation circuit can be designed, and/or electrical properties of elements of the compensation circuit can be dimensioned, such that at least one criterion independent of the previously described impedance-dependent or impedance range-dependent criterion is fulfilled. It is possible, for example, that in the compensation design step the compensation circuit is designed, and/or electrical properties of elements of the compensation circuit are dimensioned, such that a resonance frequency of the proposed circuit with the filter circuit determined in the filter design step and the antenna structure to be used deviates no more than to a defined extent from a defined frequency, in particular a fundamental frequency.

Here, electrical properties of the antenna structure can be predetermined in a fixed manner.

Furthermore, in a matching step, the electrical properties of elements of the circuit, based on its dimensioning in the corresponding design step, can be altered such that the impedance of the circuit, at least at a defined frequency or in a defined frequency range, is equal to a defined impedance or lies in a defined impedance range. It is in this regard possible for the electrical properties of elements of the filter circuit to be altered, wherein the electrical properties of elements of the compensation circuit are not altered. Alternatively, it is possible for the electrical properties of elements of the compensation circuit to be altered, wherein the electrical properties of elements of the filter circuit are not altered. Of course, however, it is also possible for both the electrical properties of elements of the filter circuit and those of the compensation circuit to be altered.

Furthermore, it is possible for only specific, in particular thus not all possible, alterations in the electrical properties to be admissible. In particular, an alteration in the electrical properties of elements of the filter circuit can be carried out only such that the limit frequency of the filter circuit is reduced by the alteration or remains the same. Alternatively or cumulatively, an alteration in the electrical properties of elements of the filter circuit can be carried out only such that the cutoff frequency of the filter circuit is smaller than or equal to the cutoff frequency of the circuit.

By means of a suitable matching of the electrical properties, it is possible for superelevations in the amplitude response in the defined frequency range to be reliably avoided.

In a further embodiment, the electrical properties of elements of the circuit are selected such that at least at a first defined frequency an imaginary portion of an impedance of the circuit is zero or deviates from zero by no more than a defined quantity.

It is in this regard possible that in the matching step the electrical properties of elements of the circuit, in particular of the filter circuit and/or of the compensation circuit, based on their dimensioning, are altered in the corresponding design step such that at least at the first defined frequency an imaginary proportion of an impedance of the circuit is zero or deviates from zero by no more than a defined quantity.

Furthermore, it is possible, in particular also in the matching step, that the electrical properties of elements of the circuit, in particular of the filter circuit and/or the compensation circuit, are selected such that at least in a first defined frequency range an imaginary proportion of an impedance of the circuit is zero or deviates from zero by no more than a defined quantity.

The first defined frequency can in particular be equal to the previously described carrier frequency. The defined frequency range can be equal to the near-field communication useful band. The first defined frequency can in particular be equal to the frequency at which the impedance of the circuit is equal to the described defined impedance or lies in a defined impedance range. Correspondingly, the first defined frequency range can comprise the frequency or the frequency range or parts thereof, at which/in which the impedance of the circuit is equal to the described defined impedance or lies in a defined impedance range.

The defined quantity can in particular be selected such that an absolute value of the impedance with this imaginary portion lies in the defined impedance range, or that the imaginary portion lies in a defined imaginary portion range, the minimum value of which is a defined quantity less than a minimum value of the defined impedance range and/or the maximum value of which is a further or the defined quantity less than a maximum value of the defined impedance range. The defined quantity can for example be 10%, 20%, 30%, 40% or 50%.

This thus also results advantageously in an especially low-loss transmission of near-field communication signals.

In a further embodiment, the electrical properties of elements of the circuit are selected such that additionally at a further defined frequency an imaginary portion of an impedance of the circuit is zero or deviates from zero by no more than a defined quantity. Preferably, the further defined frequency is equal to a so-called cut-off frequency (limit frequency) of the filter circuit. This limit frequency can in particular be the frequency at which the amplitude response of the filter circuit has decayed to 1/sqrt(2) times a maximum value.

Here it is possible that in the matching step the electrical properties of elements of the circuit, in particular of the filter circuit and/or of the compensation circuit, based on their dimensioning in the corresponding design step, are altered such that additionally at the further defined frequency an imaginary portion of an impedance of the circuit is zero or deviates from zero by no more than a defined quantity.

It is furthermore possible that particularly in the matching step the electrical properties of elements of the circuit, in particular of the filter circuit and/or of the compensation circuit, are selected such that at least in a further defined frequency range an imaginary proportion of an impedance of the circuit is zero or deviates from zero by no more than a defined quantity.

In accordance with the preceding explanations, the further defined frequency can in particular be equal to a frequency at which the impedance of the circuit is equal to the described defined impedance or lies in a defined impedance range. Accordingly, the further defined frequency range can comprise the frequency or the frequency range or parts thereof, at which/in which the impedance of the circuit is equal to the described defined impedance or lies in a defined impedance range.

The defined quantity can here be determined as previously described.

This results advantageously in a further reduction of losses in the near-field communication.

In a further embodiment, the electrical properties of elements in the circuit are selected such that a return loss or a return loss value of the circuit, that is of the entirety of filter circuit, where appropriate the compensation circuit and the NFC antenna structure is smaller than a first defined value at a defined frequency and/or that a return loss is less than a further defined value in a defined frequency range. The defined value of the further defined value can for example be −15 dB. It is of course possible for the electrical properties of elements of the circuit also to be selected such that the return loss of the circuit at at least one further frequency is less than a defined value which can be assigned to this further frequency. In this regard, the return loss, as hereinafter described, can be determined with quantities which are detected at input terminals of the filter circuit, wherein these input terminals can be connected or are connected with output terminals of the unit for generating a near-field communication signal.

In this regard, it is possible that in the matching step the electrical properties of elements of the circuit, in particular of the filter circuit and/or of the compensation circuit, based on their dimensioning in the corresponding design step, are altered such that the return loss of the circuit, that is of the entirety of filter circuit, where appropriate the compensation circuit and the NFC antenna structure, is smaller than a first defined value at a predetermined frequency, and/or that a return loss is less than a further defined value in a defined frequency range.

The term "reflection factor" (also "reflection coefficient") describes in particular an amplitude ratio between reflected and incident wave in the transition into another propagation medium. According to electrical transmission line theory, the reflections result from discontinuities in the line path. These can be misalignments at the end of the line or also at interposed circuit parts (components, transitions, pieces of line). The reflection factor $\Gamma$ is a complex variable. The size of the reflection factor specifies by which proportion the reflected wave is weaker than the incident wave, and the argument of the reflection factor specifies which phase the reflected wave has with respect to the incident wave.

For the reflection factor $\Gamma$ the following is true:

$$\Gamma = U\_refl/U\_inc \quad \text{Formula 4,}$$

wherein U_refl describes the reflected wave and U_inc the incident wave.

The return loss (RL) can be calculated from the size of $\Gamma$ as follows:

$$RL = 20*\log(|\Gamma|) \quad \text{Formula 5.}$$

The return loss RL can also be interpreted directly as a power ratio, in particular as the ratio $$RL=10*\log(P\_refl/P\_Inc) \quad \text{Formula 6,}$$

of reflected power P_refl and coupled-in power P_inc.

The return loss is thus a measurement of which power portion of the coupled-in signal cannot be realised by a consumer, in the present case thus the antenna structure, because it is reflected back into the source.

The return loss is in the present disclosure given as a negative value. However, it is also possible to calculate the return loss as a function of the reverse power ratio (P_inc/P_refl). In this case, the return loss simply changes only in sign.

The definition/calculation of the return loss selected for this disclosure has the advantage that the corresponding value immediately shows how small the reflected value is. A return loss of −20 dB means for example that only a hundredth of the coupled-in power is reflected back into the source.

The previously described reflection factor (as a complex value) can be read directly from the Smith diagram. From the value of the reflection factor, as also previously described, the return loss RL can be determined.

The return loss specifies which portion P_ref of the input signal generated by the unit for generating the near-field communication signal with a power P_inc is reflected at the terminals of the antenna structure back into the source, that is back into the unit, that is, cannot be converted into an electromagnetic wave in the antenna structure for near-field communication signal transmission. The smaller the value of the return loss, the better the source (here the unit for NFC signal generation) is matched to the unit for generating the electromagnetic waves (the NFC antenna structure). For example, a return loss of −10 dB frequently applies as a quantity for a good match.

The defined frequency can again be equal to the carrier frequency. Thus, the first defined return loss value can be assigned to the carrier frequency. In the same way, the first defined return loss value, but preferably a return loss value different therefrom, in particular a higher return loss value, can be assigned to a side frequency. The defined frequency range can correspond to the near-field communication useful band.

The defined frequency can in particular be equal to the frequency at which the impedance of the circuit is equal to the described defined impedance or lies in a defined impedance range. Accordingly, the defined frequency range can comprise the frequency or the frequency range or parts thereof, at which/in which the impedance of the circuit is equal to the described defined impedance or lies in a defined impedance range.

The first defined return loss value can for example be −15 dB. Thus there is the advantageous result that a ratio of the portion P_ref to the input power Pin is less than 3%, in particular less than 2.6%. It is possible for return loss values of −6 dB or −4 dB to be assigned to side frequencies.

The further defined return loss value can for example be −4 dB or −5 dB. Thus there is the advantageous result that a ratio of the portion P_ref to the input power Pin for all frequencies of the frequency range is less than 33% or less than 25%.

In a further embodiment, the filter circuit has at least one grounding section which is connected with a reference potential. The reference potential is preferably a mass potential (ground potential). This results advantageously in a generation of the near-field communication signal which is as failure-free as possible.

In a preferred embodiment, the filter circuit is designed symmetrically relative to the grounding section. This can mean that the first partial arrangement of electrical components of the filter circuit between a first alternating voltage input terminal of the filter circuit and the grounding section is equal to a second partial arrangement of further electrical components of the filter circuit between a second alternating voltage input terminal and the grounding section.

In this regard, the first input terminal can be connected with a first alternating voltage output terminal of the previously described unit for generating a near-field communication signal. Furthermore, the second input terminal can be connected with a second alternating voltage output terminal of the previously described unit for generating a near-field communication signal.

In other words, the two explained partial arrangements can be designed identically, in particular with regard to a dimensioning of the electrical components and their electrical arrangement/connection. Thus, if the first alternating voltage input terminal of the filter circuit is connected via the first partial arrangement of electrical components of the filter circuit with the grounding section, then the second alternating voltage input terminal of the filter circuit can be electrically connected with the grounding section via the second partial arrangement, wherein the second arrangement is designed identically to the first arrangement.

There is thus the advantageous result that electrical components of the filter circuit can have smaller dimensions with regard to maximally admissible voltages/currents occurring during operation, as a result of which construction space and costs involved in the production of the proposed circuit can in turn be reduced.

Also proposed is a device for inductive power transfer and for signal transmission, in particular for near-field communication signal transmission. Inductive power transfer is in particular a transfer of energy to a mobile terminal device, e.g. a mobile telephone or a tablet PC, which can also be described as a receiver.

The device for inductive power transfer can comprise a circuit for generating the electromagnetic field, wherein such a circuit can comprise at least one inverter. This can also be described as a power transfer circuit. Furthermore, such a circuit can comprise or have at least one control unit for controlling the operation of the inverter, at least one filter unit for filtering an output voltage of the inverter as well as at least one winding structure for generating the electromagnetic field for inductive power transfer when the output voltage is applied to it.

Furthermore, the device for inductive power transfer and for signal transmission can comprise a circuit for transmitting/receiving, that is for the transmission, of a mobile radio signal. This circuit can also be described as a mobile radio transmission circuit. The mobile radio transmission circuit can serve for transmitting mobile radio signals between an external, in particular portable, terminal device, for example a mobile telephone, and a further communication unit, for example a base station. The mobile radio transmission circuit can here comprise an antenna structure for a transmission of signals between the external, in particular portable, terminal device. Furthermore, the mobile radio transmission circuit can also comprise an antenna structure for a transmission of signals between the further communication unit, or can be or become connected with such. The mobile radio transmission circuit can also comprise an amplifying unit for amplifying the transmitted signals and/or a damping device for damping the transmitted signals.

Furthermore, the device comprises a unit for generating a near-field communication signal and a circuit according to any of the embodiments described in this disclosure. This can also be described as a near-field transmission circuit. Further, the unit for generating the near-field communication signal and this near-field transmission circuit are electrically connected. Thus, the unit can generate the near-field communication signal and transmit it via the filter circuit and where appropriate via the compensation circuit to the antenna structure for near-field communication signal transmission.

The power transfer circuit can be different from the proposed circuit for the connection by means of signals. Furthermore, the power transfer circuit can be different from the mobile radio transmission circuit. Furthermore, the mobile radio transmission circuit can be different from the near-field transmission circuit. In particular, elements of the circuits of this device can be different from one another.

The power transfer circuit and the proposed near-field transmission circuit or some or all of the elements of these circuits can be arranged in a shared housing. Furthermore, the mobile radio transmission circuit or some or all of the elements of this circuit can also be arranged in the shared housing.

Preferably, the circuits, that is the power transfer circuit, the mobile radio transmission circuit and the proposed near-field transmission circuit, or some or all of the elements of these circuits are arranged on or at or in a shared printed circuit board.

In this regard it is possible for elements of one of these circuits to be arranged only on one side of the printed circuit board. It is however also possible for different elements of one of these circuits to be arranged on different sides of the printed circuit board.

By means of the proposed design of the near-field transmission circuit, it can be advantageously achieved that the EMC of the proposed device for inductive power transfer and for signal transmission is improved, particularly in the VHF frequency range. Thus, it was able to be observed that when using near-field transmission circuits according to the state of the art it is not possible to achieve sufficient damping, in particular of the harmonics, of the NFC useful signal in particular in the VHF frequency range, which is particularly caused also by electromagnetic interactions between the elements of the power transfer circuit, this near-field transmission circuits and/or a possibly present mobile radio transmission circuit. Thus it has been found that particularly the antenna structure of a mobile radio transfer circuit and the corresponding cabling have a large influence on the EMC of the near-field communication.

When using the near-field transmission circuit according to the invention, the advantageous result is that an effective damping of undesired frequencies can be achieved despite the electromagnetic interactions between the circuits or elements of the circuits. A particular reason for this is that the properties of the proposed near-field transmission circuit are particularly well matched to the properties of the power transfer circuit and, when present, the properties of the mobile radio signal transmission circuit.

It has also found that elements of the power transfer circuit or elements of the system for inductive power transfer and/or elements of the mobile radio signal transmission circuit or elements of the system for mobile radio transmission affect the transmission of near-field communication signals such that these need to be generated and transmitted with a high power. As a result, however, also interference signal components of the near-field communication signal are generated with an undesirable high power and have a disadvantageous effect on the EMC. It has also been found that interference signal components generated in this manner are reflected in an undesirable manner by elements of the power transfer circuit or elements of the system for inductive power transfer and/or elements of the mobile radio signal transmission circuit or elements of the system for mobile radio transmission, which also has a disadvantageous effect on the EMC. When using the near-field transmission circuit according to the invention, the advantageous result is that these effects of the interference signal components are effectively reduced.

In a further embodiment, the device comprises at least one winding structure for generating an electromagnetic field for inductive power transfer. This can form an element of the circuit for generating the electromagnetic field, that is the power transfer circuit. This has already been explained previously. The winding structure is in particular different from the antenna structure for near-field communication signal transmission and from the antenna structure for mobile radio signal transmission.

In a further embodiment, the device comprises at least one damping structure for damping the electromagnetic field generated by the winding structure, in particular for damping the electrical field generated by the winding structure. This damping structure can in particular be designed as a damping mesh.

The electrical field of the winding structure here describes the electrical field or the electrical part of the electromagnetic field generated by the winding structure. In this regard, the damping structure can at least partially overlap in a projection plane with the at least one winding structure. The projection plane can be a plane which is oriented perpendicularly to the central axis of the winding structure.

If the winding structure has e.g. an envelope, in particular an envelope with minimal geometric dimensions, then at least one part of the damping structure can be arranged within this envelope in the projection plane. If the device has a bearing surface for a terminal device, then the damping structure or at least a part of the damping structure can be arranged along the central axis between the winding structure and the bearing surface. Also a part of the bearing surface can in this regard overlap with the winding structure and/or the damping structure in the projection plane.

The damping structure can for example at least partially be designed as a comb structure. A comb structure here comprises for example one or several central webs and teeth arranged perpendicularly thereto. The web and the teeth can for example be made of a material with a defined conductivity, e.g. copper.

The damping structure serves in this regard for damping an electrical field or the electrical part of the electromagnetic field. For example, the damping structure can be designed such that the electrical field which is generated by the winding structure is damped by at least 20 dB after passage through the damping structure, or is preferably completely damped. At the same time, the damping structure can be designed such that a damping of the magnetic field or of the magnetic part of the electromagnetic field generated by the winding structure is minimal. For example, the damping structure can be designed such that after passing through the damping structure the magnetic field is damped at most by 1 dB, or ideally is not damped.

Thus, the damping structure serves as far as possible exclusively for damping the electrical field, while the magnetic field is affected as little as possible.

Advantageously, this makes it possible for a signal transmission to be affected as little as possible by the electrical field of the electromagnetic field generated by the winding structure. However, at the same time it is ensured that the power transfer or signal transmission taking place via the magnetic field of the electromagnetic field is guaranteed and is also affected as little as possible. The damping of the electrical field has the advantageous result of complying with the EMC directives on radiation. This is particularly important for use in the automobile field, in particular in the interior of a motor vehicle.

The inductive power transfer by means of the electromagnetic field is connected with a distinct alternating electric field, which occurs not only at the basic frequency, for example in the interval between 10 kHz and 10 MHz, but also (at a required high efficiency) in the upper waves of the basic frequency. Thus, the spectrum contains maxima at multiples of the basic frequency. The proposed damping structure also advantageously facilitates the shielding of these upper waves, wherein the magnetic field is damped not at all or only slightly.

In a further embodiment, the device comprises an antenna structure for transmitting and receiving mobile radio signals. This antenna structure can also be described as a coupling antenna. The coupling antenna can be an element of the mobile radio transmission circuit. This antenna structure can be different from the antenna structure for near-field communication signal transmission. The coupling antenna can serve for a transmission of signals between an external, in particular portable, terminal device and the mobile radio transmission circuit.

Thus, a communication signal can be transmitted or received via the antenna structure for near-field communication signal transmission and a further communication signal can be transmitted or received via the antenna structure for transmitting and receiving mobile radio signals.

A mobile radio signal can here comprise/have frequencies in a range from 700 MHz (inclusive) to 2600 MHz (inclusive). In particular, the coupling antenna can comprise a first partial structure and a second partial structure, wherein the coupling antenna is designed such that signals can be received and transmitted in a defined frequency range by means of the coupling antenna.

The frequency of the electromagnetic field for inductive power transfer here lies outside frequency range from 700 MHz to 2600 MHz. In particular, the frequency of the electromagnetic field for inductive power transfer is different from the frequency/frequencies of the near-field communication signal and is also different from the frequency/frequencies of the mobile radio signal. Furthermore, the frequency of the mobile radio signal is different from the frequency/frequencies of the near-field communication signal.

The frequency of the electromagnetic field for inductive power transfer can lie in a frequency range from 100 kHz to 10 MHz, further, for example, in a frequency range from 105 kHz to 205 kHz.

In a further embodiment, at least one section of the antenna structure for near-field communication signal transmission and at least one section of the winding structure and/or at least one section of the damping structure and/or at least one section of the antenna structure for mobile radio signal transmission, that is the coupling antenna, overlap in a common projection plane.

The common projection plane has already been explained previously. The projection plane can also be oriented perpendicularly to a central symmetry axis of the antenna structure for near-field communication signal transmission and/or perpendicularly to a central symmetry axis of the coupling antenna and/or perpendicularly to the surface of the described printed circuit board.

Thus, in particular the antenna structure for near-field communication signal transmission or a part thereof can overlap with the damping structure or a part thereof in the common projection plane. Alternatively or preferably cumulatively, the antenna structure for near-field communication signal transmission or a part thereof can overlap with the coupling antenna or a part thereof in the common projection plane. Further alternatively or preferably cumulatively, the antenna structure for near-field communication signal transmission or a part thereof can overlap with the winding structure or a part thereof in a common projection plane. This overlap can be the reason for the previously explained electromagnetic interaction between the elements of the individual circuits.

Also proposed is a method for manufacturing a circuit for the connection, by means of signals, of a unit for generating a near-field communication signal to an antenna structure for near-field communication signal transmission. The method serves for the manufacturing of a circuit according to any of the embodiments disclosed in this disclosure and can therefore comprise all steps necessary for manufacturing such a circuit.

Here, at least one filter circuit and one antenna structure are provided, wherein the circuit comprises the at least one filter circuit and the antenna structure. Further, the filter circuit is provided as an even-numbered order filter circuit, wherein the ordinal number is at least 4. Furthermore, the circuit is provided such that an amplitude response decreases monotonically in a defined frequency range.

In particular, a design or a configuration of the circuit and/or properties, in particular electrical properties, of electrical or electronic elements of the circuit can be selected such that the amplitude response decreases monotonically in the defined frequency range. In particular, the previously described filter design step and the matching step can be carried out. Also, as previously described, a compensation design step can be carried out.

The proposed method for manufacturing the circuit can be a part of a method for manufacturing a device for inductive power transfer and for signal transmission according to any of the embodiments described in this disclosure. Such a method serves for the manufacturing of such a device and can for this reason comprise all steps necessary for manufacturing such a circuit. In particular, in such a method, a winding structure can be provided for generating an electromagnetic field for inductive power transfer and/or a damping structure and/or an antenna structure for transmitting and receiving mobile radio signals. Further, these structures or elements of these circuits, as previously explained, can be arranged on a shared printed circuit board. Alternatively or cumulatively, a section of the antenna structure for near-field communication signal transmission and/or at least one section of the winding structure and/or at least one section of the damping structure and/or at least one section of the antenna structure for mobile radio signal transmission can overlap in a common projection plane.

BRIEF DESCRIPTION OF THE DRAWINGS

The invention will be described in more detail with reference to exemplary embodiments. The figures show.

Hereinafter, identical reference signs describe elements with identical or similar technical features.

DETAILED DESCRIPTION

Figure 1:
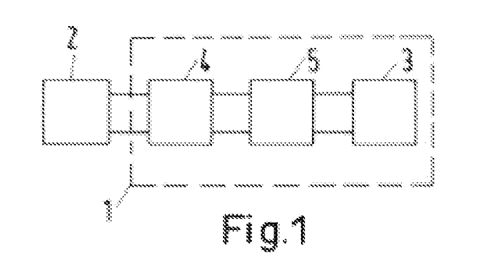
FIG. 1 a schematic block diagram of a circuit according to the invention for the connection, by means of signals, of a unit for generating a near-field communication signal to an antenna structure, FIG. 2 a schematic block diagram device for inductive power transfer and for signal transmission, FIG. 3 a schematic circuit diagram of a filter circuit, FIG. 4 an exemplary amplitude response of a circuit according to the invention, FIG. 5 a further exemplary amplitude response of a circuit according to the invention and FIG. 6 a schematic top view onto a printed circuit board.

FIG. 1 shows a schematic block diagram of a circuit 1 according to the invention for the connection, by means of signals, of a unit in the form e.g. of a microcontroller 2 or a so-called NFC chip for generating a near-field communication signal and an antenna structure 3 for near-field communication signal transmission.

The circuit 1 comprises a filter circuit 4, a compensation circuit 5 and the antenna structure 3 for near-field communication signal transmission. In FIG. 1 it is shown that the filter circuit 4, the compensation circuit 5 and the antenna structure 3 are connected behind one another, that is in series. Input terminals of the filter circuit 4 are connected by means of signals with output terminals of the microcontroller 2. The microcontroller 2 generates an alternating voltage as a near-field communication signal. This alternating voltage is transmitted via the filter circuit 4 and the compensation circuit 5 to the antenna structure 3. The antenna structure 3 then generates an electromagnetic field for near-field communication signal transmission as a function of the alternating voltage thus transmitted. The filter circuit 4 is an even-numbered order filter circuit. This will be described in more detail with reference to FIG. 3. As can also be seen in FIG. 4, an amplitude response of the circuit 1 decreases monotonically, preferably strictly monotonically, in a defined frequency range, in particular in the frequency range from 14.4 MHz to 114.4 MHz.

In particular, the electrical properties of electrical or electronic elements of the circuit 1, in particular of the filter circuit 4, are selected such that at a defined frequency, in particular at a carrier frequency of the near-field communication signal, which can for example be 13.56 MHz, an impedance of the circuit 1 is equal to a defined impedance or lies in a defined impedance range, for example in an impedance range from 30 ohms to 50 ohms.

It is also possible for the electrical properties of the elements of the circuit 1, in particular of the filter circuit, 4 to be selected such that the impedance of the circuit 1 in a defined frequency range, in particular in the previously described near-field communication signal useful band, which comprises for example frequencies from 12.712 MHz to 14.4 07 MHz, lies in the described impedance range.

Furthermore, it is possible for the electrical properties of the elements of the circuit 1, in particular of the filter circuit 4, to be selected such that, at a first defined frequency, an imaginary proportion of the impedance of the circuit 1 is zero. The first defined frequency can in particular be the previously described carrier frequency.

Furthermore, it is possible for the electrical properties of the elements of the circuit 1, in particular of the filter circuit 4, to be selected such that also at at least one or several further frequencies, the imaginary proportion of the impedance of the circuit 1 is zero, in particular at a cutoff frequency of the filter circuit 4.

Here, it is possible that the previously described design steps for the filter and compensation circuit 4, 5 were carried out, wherein the selection of the electrical properties of electrical or electronic elements circuit 1 is then carried out in a matching step, wherein in the matching step an alteration of the electrical properties determined in the design step then takes place.

Figure 2:
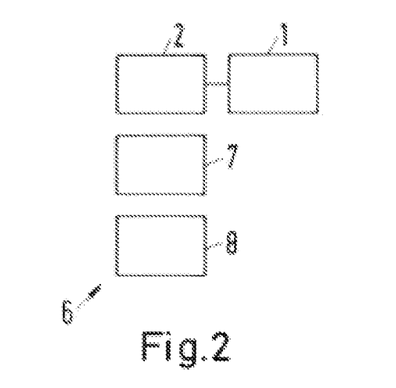

FIG. 2 shows a schematic block diagram of a device 6 for inductive power transfer and for signal transmission. The device 6 comprises a unit, for example designed as a microcontroller 2, for generating a near-field communication signal and the circuit 1 shown in FIG. 1 for the connection, by means of signals, of the microcontroller 2 to the antenna structure 3. Furthermore, the device 6 comprises a winding structure 7 for generating an electromagnetic field for inductive power transfer. Furthermore, the device 6 comprises an antenna structure 8 for transmitting and receiving mobile radio signals, which is described hereinafter also as a mobile radio antenna structure 8.

It is possible, but not shown, that the device 6 further comprises a damping structure 9 (see for example FIG. 3) for damping the electromagnetic field generated by the winding structure 7.

Figure 3:
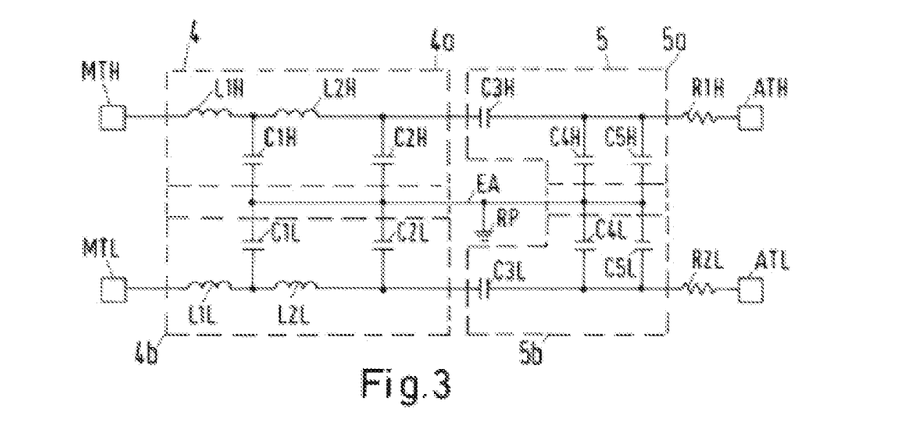

FIG. 3 shows a schematic block diagram of a filter circuit 4 and a compensation circuit 5. The filter circuit 4 comprises two partial arrangements, specifically a first filter partial arrangement 4a and a second filter partial arrangement 4b.

Shown is a first microcontroller-sided terminal MTH and a further microcontroller-sided terminal MTL of the filter circuit 4. Also shown are a first antenna structure-sided terminal ATH and a further antenna structure-sided terminal ATL of the compensation circuit 5. The antenna structure 3 can be connected to these terminals ATH, ATL.

The filter circuit 4 has a grounding section EA which is connected electrically with a reference potential RP. The reference potential RP can in particular be a mass potential. Furthermore, it is shown that the filter circuit 4 is designed symmetrically relative to the grounding section EA. In particular, an electrical connection between the first microcontroller-sided terminal MTH and the grounding section EA, that is the first filter partial arrangement 4a, is designed in the same manner as the electrical connection between the second microcontroller-sided terminal MTL and the grounding section EA, that is as the second filter partial arrangement 4b. The filter partial arrangements 4a, 4b comprise in each case a first inductive element L1H, L1L e.g. designed as a coil. Furthermore, the filter partial arrangements 4a, 4b comprise in each case a first capacitive element C1H, C1L designed in each case e.g. as a capacitor. The first microcontroller-sided terminal MTH is connected with the grounding section EA via a series circuit of the first inductive and the first capacitive element L1H, C1H of the first filter partial arrangement 4a. The second microcontroller-sided terminal MTL side is connected with the grounding section EA via a series circuit of the first inductive and the first capacitive element L1L, C1L of the second filter partial arrangement 4b.

The first inductive elements L1H, L1L can have in each case inductances in the range from 330 nH to 1.5 µH, preferably in the range from 400 nH to 600 nH. The first capacitive elements C1H, C1L can have in each case capacitances in the range from 220 pF to 700 pF, preferably in the range from 400 pF to 600 pF.

Further, the filter partial arrangements 4a, 4b comprise in each case a second inductive element L2H, L2L designed e.g. as a coil. Further, the filter partial arrangements 4a, 4b comprise in each case a capacitive element C2H, C2L designed e.g. as a capacitor. A series connection of the second inductive and the second capacitive element L2H, C2H of the first filter partial arrangement 4a is arranged electrically parallel to the first capacitive element C1H of the first filter partial arrangement 4a. Accordingly, a series connection of the second inductive and the second capacitive element L2H, C2H of the second filter partial arrangement 4b is arranged electrically parallel to the first capacitive element C1L of the second filter partial arrangement 4b.

The second inductive elements L2H, L2L can have in each case inductances in the range from 330 nH to 1.5 µH, preferably in the range from 500 nH to 1 µH. The second capacitive elements C2H, C2L can have in each case capacitances in the range from 200 pF to 700 pF, preferably in the range from 200 pF to 560 pF.

Each filter arrangement 4a, 4b forms a fourth order low-pass filter. In particular, the series connection of the first inductive and the first capacitive element L1H, L1L, C1H, C1L of the respective filter partial arrangement 4a, 4b forms in each case a second order low-pass filter. Also the series connection of the second inductive and the second capacitive element L2H, L2L, C2H, C2L of the respective filter partial arrangement 4a, 4b forms in each case a second order low-pass filter.

Also the compensation circuit 5 comprises a first compensation partial arrangement 5a and a second compensation partial arrangement 5b. The first compensation partial arrangement 5a comprises a parallel connection of two capacitive elements C4H, C5H designed e.g. as capacitors. Furthermore, the first compensation partial arrangement 5a comprises a further capacitive element C3H designed e.g. as a capacitor, wherein the first compensation partial arrangement 5a is formed from the series connection of this further capacitive element C3H and the described parallel connection.

A first capacitive element of the parallel connection C4H, C5H can have a capacitance in the range from 1 pF to 220 pF, preferably in the range from 1 pF to 120 pF. The remaining capacitive element C5H, C4H can then have a capacitance in the range from 0 pF to 100 pF. The further capacitive element C3H can have a capacitance in the range from 1 pF to 100 pF, preferably in the range from 1 pF to 70 pF.

The second compensation partial arrangement 5b comprises a parallel connection of two capacitive elements C4L, C5L designed e.g. as capacitors. Furthermore, the second compensation partial arrangement 5b comprises a further capacitive element C3L designed e.g. as a capacitor, wherein the second compensation partial arrangement 5b is formed from the series connection of this further capacitive element C3L and the described parallel connection.

A first capacitive element of the parallel connection C4L, C5L can have a capacitance in the range from 1 pF to 220 pF, preferably in the range from 1 pF to 120 pF. The remaining capacitive element C5L, C4L can then have a capacitance in the range from 0 pF to 100 pF. The further capacitive element C3L can have a capacitance in the range from 1 pF to 100 pF, preferably in the range from 1 pF to 70 pF.

The first antenna structured-sided terminal ATH is connected with the first compensation partial arrangement 5a via a first resistive element R1H designed e.g. as a resistance. The second antenna structured-sided terminal ATL is connected with the second compensation partial arrangement 5b via a second resistive element R2L designed e.g. as a resistance. In particular, the first antenna structured-sided terminal ATH is connected with the grounding section EA via a series connection of the first resistive element R1H and the first compensation partial arrangement 5a. Accordingly, the second antenna structured-sided terminal ATL is connected with the grounding section EA via a series connection of the second resistive element R2L and the second compensation partial arrangement 5b.

The first resistive element R1H can have a resistance in the range from 0Ω to 4Ω, preferably in the range from 0Ω to 1Ω. The second resistive element R2L can have a resistance in the range from 0Ω to 4Ω, preferably in the range from 0Ω to 1Ω. The antenna structure can have an inductance in the range from 500 nH to 4 µH.

In particular, a connecting section between the second inductive element L2H and the second capacitive element C2H of the first filter partial arrangement 4a is connected via the capacitive element C3H with the connecting section between the first resistive element R1H and the parallel connection of the capacitive elements C4H, C5H of the first compensation partial arrangement 5a. Correspondingly, a connecting section between the second inductive element L2L and the second capacitive element C2L of the second filter partial arrangement 4b is connected via the capacitive element C3L with the connecting section between the second resistive element R2L and the parallel connection of the capacitive elements C4L, C5L of the second compensation partial arrangement 5b.

It is possible that an inductance of the first inductive elements L1H, L1L of the filter partial arrangements 4a, 4b is equal. Accordingly, it is possible for an inductance of the second inductive elements L2H, L2L of the filter partial arrangements 4a, 4b to be equal. It is possible for a capacitance of the first capacitive elements C1H, C1L of the filter partial arrangements 4a, 4b to be equal. Correspondingly, it is possible for a capacitance of the second capacitive elements C2H, C2L of the filter partial arrangements 4a, 4b to be equal.

Further, the inductances of the first and the second inductive element L1H, L2H, L1L, L2L of a filter partial arrangement 4a, 4b can be different from one another. In particular, the inductance of the first inductive element L1H, L1L can be smaller than the inductance of the second inductive element L2H, L2L of the respective filter partial arrangement 4a, 4b. It is however also possible for the inductances of the first and the second inductive element L1H, L2H, L1L, L2L of the filter partial arrangements 4a, 4b to be equal. In particular, the inductance of the first inductive element L1H, L1L can be equal to the inductance of the second inductive element L2H, L2L of the respective filter partial arrangement 4a, 4b.

Further, the capacitances of the first and the second capacitive element C1H, C2H, C1L, C2L of a filter partial arrangement 4a, 4b can be different from one another. In particular, the capacitance of the first capacitive element C1H, C1L can be larger than the capacitance of the second capacitive element C2H, C2L of the respective filter partial arrangement 4a, 4b. It is however also possible for the capacitances of the first and the second capacitive element C1H, C2H, C1L, C2L of the filter partial arrangements 4a, 4b to be equal. In particular, the capacitance of the first capacitive element C1H, C1L can be equal to the capacitance of the second capacitive element C2H, C2L of the respective filter partial arrangement 4a, 4b.

Further, the capacitances of the capacitive elements C3H, C3L for connecting the filter partial arrangements 4a, 4b with the compensation partial arrangements 5a, 5b can be equal.

Further, the capacitances of the two capacitive elements C4H, C5H, C4L, C5L of a compensation partial arrangement 5a, 5b can be different from one another.

Figure 4:
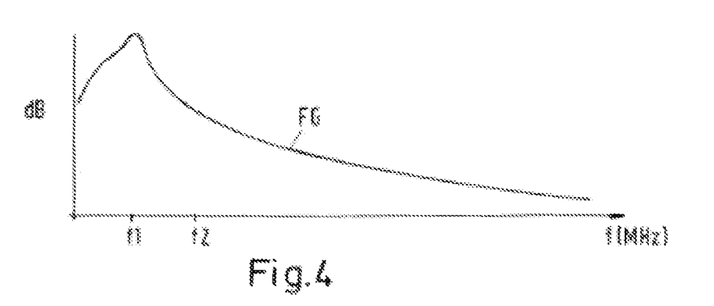

FIG. 4 shows an exemplary amplitude response FG of a circuit 1 according to the invention (see for example FIG. 1). It is shown in an exemplary manner that at a carrier frequency f1 of 13.56 MHz the damping is zero or is very low. At frequencies f which are higher than 14.4 MHz, the shown amplitude response decreases strictly monotonically. Thus, at a second frequency f2 of 27.12 MHz, the damping is for example −51.13 dB. It can in particular be seen that in the VHF frequency range, which comprises frequencies from 87 MHz to 108 MHz, a damping is less than −54 dB.

Figure 5:
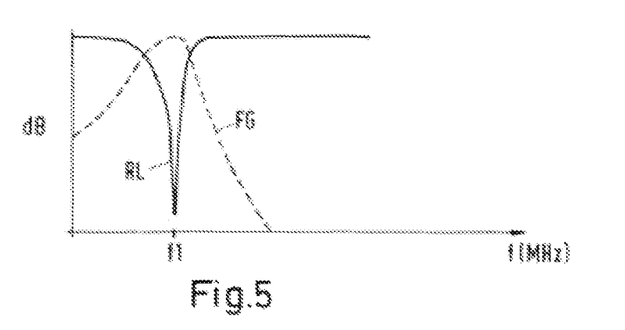

FIG. 5 shows, in addition to the amplitude response FG shown in FIG. 4, of the circuit 1, a curve of the return loss RL of the circuit 1 for different frequencies f. It is shown in an exemplary manner that the return loss RL in a frequency range from 12.712 MHz to 14.408 MHz is less than −4 dB. At a carrier frequency f1, the return loss RL is less than −15 dB.

In other words, it is obvious that there is a very low return loss in a near-field communication useful band, and a very efficient signal transmission for near-field communication is thus enabled with the circuit 1.

Figure 6:
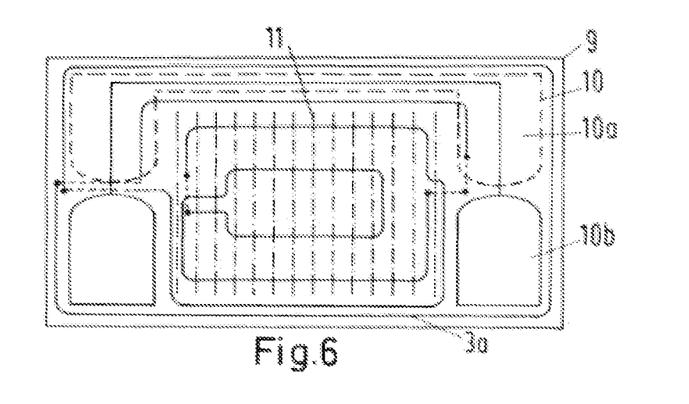

FIG. 6 shows a schematic top view onto a printed circuit board 9. Shown dashed are structures or elements which are arranged on or at a bottom side or lower surface of the printed circuit board 9. Structures or elements which are arranged on or at a top side or upper surface of the printed circuit board 9 are shown with solid lines. FIG. 6 serves here to show the overlapping of elements of a system for near-field communication signal transmission, a system for inductive power transfer and a system for mobile radio signal transmission, wherein, however, only selected, and not all, elements of this system are shown.

Shown is a first partial structure 10a of a coupling antenna 10 which is arranged on a bottom side of the printed circuit board 9. Also shown is a second partial structure 10b of the coupling antenna 10, which is arranged on the top side of the printed circuit board 9. The coupling antenna 10 forms an antenna structure 8 for mobile radio signal transmission (see FIG. 2). Shown with dash-dot lines is a damping structure 11 which is arranged on the bottom side of the printed circuit board 9. Also shown is a first partial structure 3a of an antenna structure 3 for near-field communication signal transmission, which is arranged on the top side of the printed circuit board 9.

Not shown is a winding structure 7 for generating an electromagnetic field for inductive power transfer. This winding structure 7 can in particular not be arranged at or on the printed circuit board 9. However, such a winding structure 7 can be arranged such that an electromagnetic field generated by this winding structure 7, in particular by the electrical portion of this field, is damped by the damping structure 11 during transmission to a terminal device (not shown).

In a common projection plane which is oriented perpendicularly to a central symmetry axis of the damping structure 11 or of the antenna structure 3, or which is oriented parallel to the bottom or top side of the printed circuit board 9, a part of the antenna structure 3 overlaps the damping structure 11. It is further shown that in the common projection plane a further part of the antenna structure 3 overlaps a part of the antenna structure 8 for mobile radio signal transmission. It is further possible that in the common projection plane a part of the antenna structure 3 also overlaps the not shown winding structure 7 for generating an electromagnetic field for inductive power transfer.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

The invention claimed is:

1. A circuit, comprising:
an antenna structure configured to provide near-field signal transmission in response to receiving a communication signal; and
a filter circuit configured to operate on the communication signal prior to the communication signal being received by the antenna structure, wherein the filter circuit is an even-numbered order filter circuit, wherein the ordinal number is at least 4, wherein an amplitude response (FG) of the circuit decreases monotonically in a defined frequency range, wherein the filter circuit is configured such that additionally at a further defined frequency an imaginary proportion of an impedance of the circuit is zero or deviates from zero by not more than a fundamental frequency.

2. The circuit of claim 1, including a compensation circuit.

3. The circuit of claim 1, wherein the amplitude response (FG) of the circuit decreases only monotonically in the defined frequency range.

4. The circuit of claim 1, wherein a minimum frequency of the defined frequency range is 14.4 MHz.

5. The circuit of claim 1, wherein the filter circuit is configured so that an impedance of the circuit in a defined frequency range corresponds to a defined impedance.

6. The circuit of claim 1, wherein the filter circuit is configured such that additionally at a further defined frequency an imaginary proportion of an impedance of the circuit is zero or deviates from zero by not more than a fundamental frequency.

7. The circuit of claim 1, wherein the filter circuit has at least one grounding section (EA) which is connected with a reference potential (RP).

8. The circuit of claim 7, wherein the filter circuit is designed symmetrically relative to the grounding section (EA).

9. A circuit, comprising:
an antenna structure configured to provide near-field signal transmission in response to receiving a communication signal; and
a filter circuit configured to operate on the communication signal prior to the communication signal being received by the antenna structure, wherein the filter circuit is an even-numbered order filter circuit, wherein the ordinal number is at least 4, wherein an amplitude response (FG) of the circuit decreases monotonically in a defined frequency range, wherein the filter circuit is configured such that at a defined frequency a return loss (RL) of the circuit is less than a first defined value and/or that in a defined frequency range a return loss (RL) is less than a further defined value.

10. A device for inductive power transfer and for signal transmission, comprising:
a microcontroller configured to generate a near-field communication signal; and a circuit, comprising: according to an antenna structure configured to provide near-field signal transmission in response to receiving a communication signal;

a filter circuit configured to operate on the communication signal prior to the communication signal being received by the antenna structure, wherein the filter circuit is an even-numbered order filter circuit, wherein the ordinal number is at least 4, wherein an amplitude response (FG) of the circuit decreases monotonically in a defined frequency range;

a winding structure that is configured to transfer power inductively via a generated magnetic field; and a comb-shaped damping structure configured to dampen an electromagnetic field produced by the winding structure.

11. The device of claim 10, further including a mobile antenna structure configured to transmit and receive mobile radio signals.

12. The device of claim 11, wherein a section of the damping structure and a section of the mobile antenna structure overlap in a common projection plane.

13. The device of claim 10, wherein a section of the antenna structure and a section of the winding structure overlap in a common projection plane.

* * * * *